(12) United States Patent
Gafter

(10) Patent No.: US 7,627,569 B2
(45) Date of Patent: Dec. 1, 2009

(54) DOCUMENT ACCESS CONTROL

(75) Inventor: Neal Gafter, San Jose, CA (US)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 11/173,865

(22) Filed: Jun. 30, 2005

(65) Prior Publication Data

US 2007/0005595 A1 Jan. 4, 2007

(51) Int. Cl.
G06F 17/30 (2006.01)
G06F 7/00 (2006.01)

(52) U.S. Cl. .............................. 707/6; 707/3
(58) Field of Classification Search ............ 707/6, 707/5, 1, 3; 709/245, 217, 219, 218
See application file for complete search history.

(56) References Cited

U.S. PATENT DOCUMENTS

| | | | |
|---|---|---|---|
| 5,220,604 A | | 6/1993 | Gasser et al. |
| 5,261,102 A | * | 11/1993 | Hoffman ..................... 726/19 |
| 5,892,909 A | | 4/1999 | Grasso et al. |
| 6,004,276 A | * | 12/1999 | Wright et al. ............... 600/508 |
| 6,195,707 B1 | * | 2/2001 | Minh ........................ 709/245 |
| 6,314,439 B1 | * | 11/2001 | Bates et al. ................. 715/209 |
| 7,054,905 B1 | * | 5/2006 | Hanna et al. ............... 709/206 |
| 2002/0078004 A1 | | 6/2002 | Ambrosini et al. |
| 2003/0033288 A1 | * | 2/2003 | Shanahan et al. ............. 707/3 |
| 2003/0074356 A1 | | 4/2003 | Kaler et al. |
| 2003/0093409 A1 | | 5/2003 | Weil et al. |
| 2004/0088322 A1 | * | 5/2004 | Elder et al. ............. 707/103 Y |
| 2005/0097061 A1 | * | 5/2005 | Shapiro et al. ................ 705/67 |
| 2006/0026286 A1 | * | 2/2006 | Lei et al. .................... 709/227 |

FOREIGN PATENT DOCUMENTS

| | | |
|---|---|---|
| EP | 1528455 A1 | 5/2005 |
| WO | WO 02/37294 | 5/2002 |

OTHER PUBLICATIONS

Access Control List, Wikipedia, http:/en.wikipedia.org/wiki/Access_control_list, Mar. 28, 2005, 1 page.
Access Control List, searchSecurity.com Definitions, http://searchsecurity.techtarget.com/sDefinition/0,.sid14_gci213757.00.html, Mar. 28, 2005, 3 pages.
PCT Search Report, PCT/US2006/025860, dated Dec. 22, 2006, 8 pages.
PCT International Preliminary Report on Patentability PCT/US2006/025860 mailed Jan. 17, 2008 (2 pages.
PCT Written Opinion PCT/US2006/025860 mailed Jan. 17, 2008 (8 pages).

* cited by examiner

Primary Examiner—Charles Rones
Assistant Examiner—Fariborz Khoshnoodi
(74) Attorney, Agent, or Firm—Blakely, Sokoloff, Taylor & Zafman LLP

(57) ABSTRACT

Embodiments of this invention control access to documents by identifying a user requesting a document, retrieving a membership list associated with the user, retrieving an access control list (ACL) associated with the document, and intersecting the user's membership list and the document's ACL to determine if the user has privileges to access to the document. Certain embodiments of this invention filter documents in a search result to return those documents (or a list of those documents) that are accessible to a user.

12 Claims, 20 Drawing Sheets

| Member | Direct Membership |
|---|---|
| alias_all_family | ACL_protected-2 |
| alias_coworkers | ACL_coworkers |
| alias_friends | ACL_protected-2 |
| alias-grandparent | alias_all_family, ACL_protected-2 |
| alias_immediate_family | alias_all_family, ACL_protected-1 |
| user_accountant | alias_immediate_family, ACL_protected-1 |
| user_dawn | alias_immediate_family |
| user_grandpa | alias_grandparent |
| user_owner | ACL_private, ACL_protected-1, ACL_protected-2, ACL_coworkers |
| user_shawn | alias_immediate_family |
| user_terry | alias_immediate_family |
| user_paul | ACL_coworkers |

FIG. 2D

| User | Direct Membership List |
|---|---|
| user_accountant | alias_immediate_family, alias_all_family |
| user_dawn | alias_immediate_family, alias_all_family |
| user_grandpa | alias_grandparent, alias_all_family |
| user_owner | |
| user_shawn | alias_immediate_family, alias_all_family |
| user_terry | alias_immediate_family, alias_all_family |
| user_paul | |

FIG. 2E

| User | Membership List |
|---|---|
| user_accountant | alias_immediate_family, alias_all_family, ACL_protected-1 |
| user_dawn | alias_immediate_family, alias_all_family, ACL_protected-1 |
| user_grandpa | alias_grandparent, alias_all_family, ACL_protected-2 |
| user_owner | ACL_private, ACL_protected-1, ACL_protected-2, ACL-coworkers |
| user_shawn | alias_immediate_family, alias_all_family, ACL_protected-1 |
| user_terry | alias_immediate_family, alias_all_family, ACL_protected-1 |
| user_paul | ACL_coworkers |

FIG. 2H

DOCUMENT ACCESS CONTROL

TECHNICAL FIELD

The field of the invention relates to document access control, and in particular, to a method and system for controlling, determining and managing access privileges to documents.

BACKGROUND

Document, as used herein, may refer to any granularity of data which the operating system is capable of recognizing and manipulating as a distinct entity. For example, a document may be an object in a larger set of data, e.g. an object in a personal calendar, web application or web site. For example, a user may mark certain objects in the personal calendar for read access to family members, other objects for read access to co-workers, and yet other objects for read access to only the user. As another example, a user may mark certain files (e.g. photos) stored in an online web application (e.g. a file-sharing application) for access by certain users but not other users. A document may also be the larger set of data (e.g. the personal calendar, web application or web site).

Users often want to control access to documents by allowing or restricting certain actions (e.g. read, write or execute) to certain users or groups of users. Access Control Lists (ACLs) give users a way of controlling access to documents.

Conventionally, an ACL is a data structure, such as a table, that tells a computer operating system the access privileges each user has to a particular document. The access privileges allow the user to perform certain operations, such as read, write and/or execute the document.

A single ACL may control access to all available operations on the document. For example, a single ACL may indicate that a document is writable by one select group of users but readable by a larger group of users. Alternatively, separate ACLs may control access to the different operations. For example, one ACL may indicate that a document is writable by a group of users while another ACL may indicate that the document by readable to another group of users. Therefore a document may have a read ACL that lists users with permission to read the document and a write ACL that lists users with permission to modify the document.

In certain applications, a single ACL may control several documents. For example, everyone in a group (or alias) may read all messages designated for the group. Since ACLs may be or be part of a document, ACLs may also be used to control who may modify other ACLs.

Conventional systems use ACLs to control access to a document by searching the document's ACL when a user requests access. For example, when a user read request access to a document, conventional systems search the document's read ACL to determine if the user appears directly in the list. If the user does not appear directly in the list, conventional systems will recursively examine each group (or alias) appearing in the list in an attempt to find the user. To avoid infinite loops while traversing this membership structure (which includes aliases embedded in other aliases), a list of examined aliases may be kept.

The above data access control technique has several disadvantages. For example, the document's ACL may include aliases which refer to data structures stored on other machines. For example, an ACL may include five aliases, each stored in a different server. Therefore, to determine if a user has access to the document, the different servers may be accessed. That is, intermachine communication may be required.

Additionally, the time to determine whether a user has access to data may increases significantly with the number of users in the system, the number of documents being controlled, and the number of aliases defined. For example, the time to determine whether one user has access to a document can be linear to the depth of the membership structure. The more aliases are embedded in other aliases, the more time it may take to determine if a user has access. Compound this with the time a conventional system may take to determine access for multiple users, each being members of multiple groups and each requesting access to multiple documents, and the result is an access control technique that becomes increasingly resource intensively as the system grows.

Therefore, what is desired is an improved system and method for controlling access to documents.

BRIEF SUMMARY

In accordance with one embodiment of the invention, a method may associate a user with a first set of aliases, associate a document with a second set of aliases and grant the user access to the document when the first set and second set have an alias in common.

BRIEF DESCRIPTION OF THE DRAWINGS

FIGS. 2A-2H show data structures representing various mappings and representations of ACLs, aliases and users in accordance with embodiments of this invention.

DETAILED DESCRIPTION

Embodiments of this invention provide a method and system for controlling access to documents. This control may be provided by identifying a user requesting a document, retrieving a membership list associated with the user, retrieving an access control list (ACL) associated with the document, and intersecting the user's membership list and the document's ACL to determine if the user has privileges to access to the document.

Figure 1A:
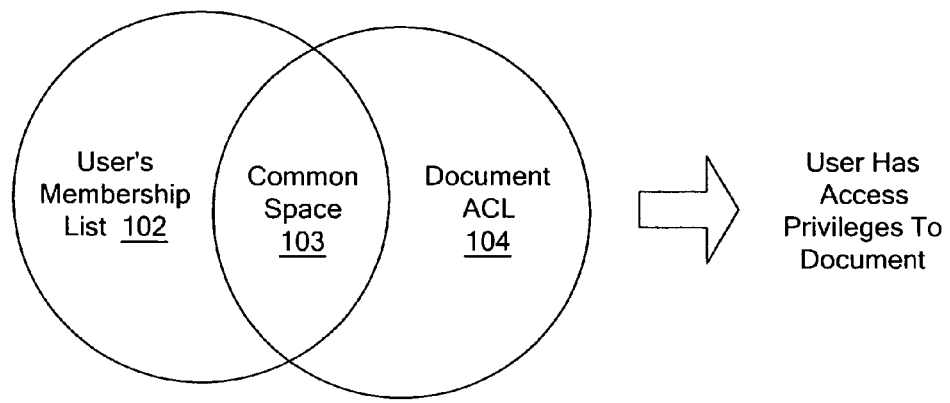
FIG. 1A is a diagram of a membership list and an ACL that results in granting a user access to a document in accordance with one embodiment of this invention.

FIG. 1A is a diagram of a membership list and an ACL that results in granting a user access to a document in accordance with one embodiment of this invention. The intersection of the user's membership list 102 and document ACL 104 is common space 103. Common space 103 indicates that the user's membership list 102 and document ACL 104 have at least one alias in common. In other words, user's membership list ∩ document ACL≠∅. Therefore, the user has access privileges to the document and the request is granted.

Figure 1B:
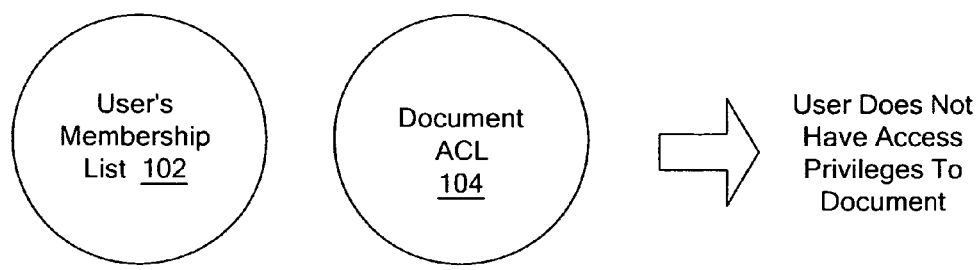
FIG. 1B is a diagram of a membership list and an ACL that results in denying a user access to a document in accordance with one embodiment of this invention.

FIG. 1B is a diagram of a membership list and an ACL that results in denying a user access to a document in accordance with one embodiment of this invention. The user's membership list 102 and document ACL 104 do not intersect to form a common space. This indicates that the user's membership list 102 and document ACL 104 do not have any aliases in common. In other words, user's membership list ∩ document ACL=∅. Therefore, the user does not have access privileges to the document and the request is denied.

To illustrate embodiments of this invention more concretely, the following provides variations and examples of various aspects of embodiments of the invention. Specifically, to better illustrate the architecture and processes of embodiments of this invention described below, FIGS. 2A-2H provide sample mappings of documents to access control lists (ACLs), ACLs to users and aliases, aliases to users and other aliases, and users to aliases. It will be appreciated that the following variations and examples are not intended to be exhaustive or to limit the invention to the precise forms disclosed. These variations and examples are to provide further understanding of embodiments of the present invention.

Sample Mappings

FIGS. 2A-2H show data structures representing various mappings and representations of ACLs, aliases and users in accordance with embodiments of this invention. Although specific data structures may be shown (e.g. the table of FIG. 2A or the tree of FIG. 2B), any data structure may be used, including but not limited to, tables, arrays, lists (e.g. comma-delineated lists and tab-delineated lists), trees and extensible markup language (XML) documents. Additionally, each of the data structures may be presented in a variety of ways, including being sorted by keys. Furthermore, these data structures may be stored in volatile or non-volatile memory, including a cache.

Figure 2A:
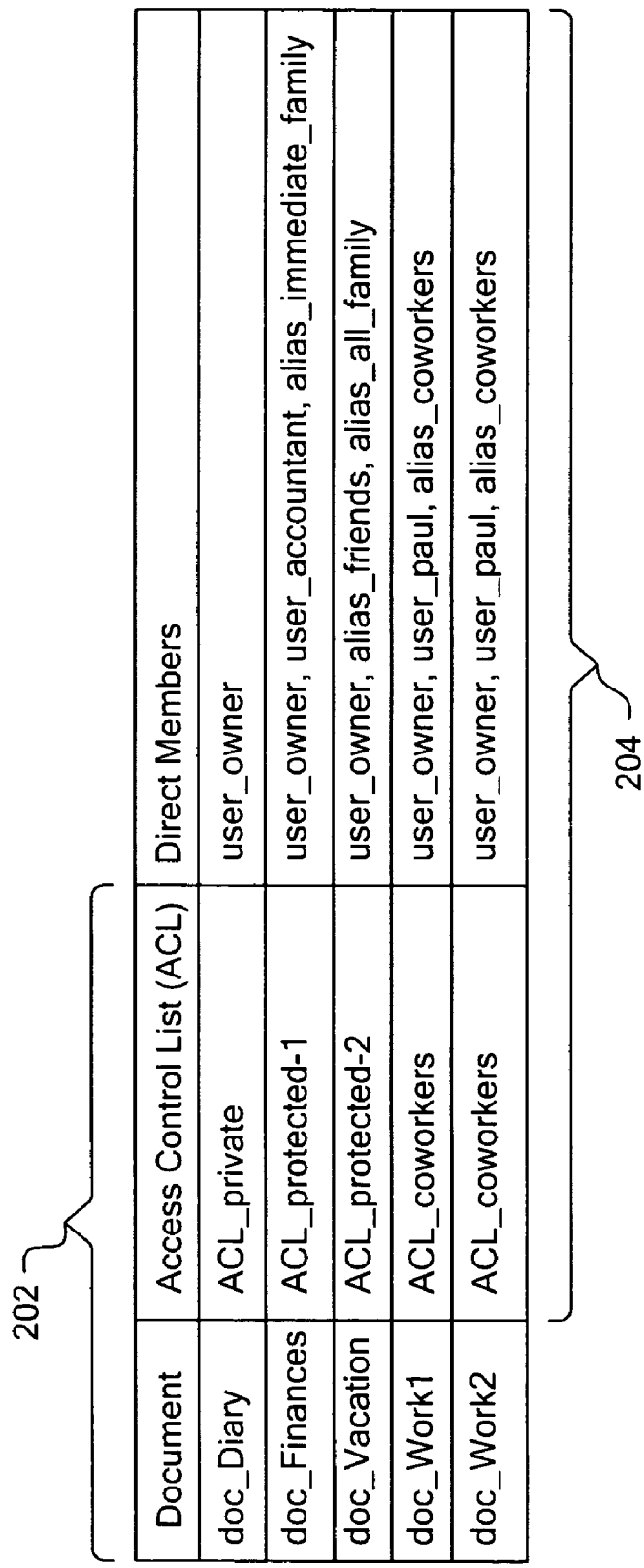

FIG. 2A shows a table representing a mapping between documents and access control lists (ACLs) in accordance with one embodiment of this invention. FIG. 2A may be considered an "ACL map." An ACL map is a map from each document to each document's access control list.

For illustrative purposes, in addition to showing the mappings from each document to an ACL, the table in FIG. 2A shows each ACL's direct members. These direct members may not be shown in an ACL map of other embodiments. Rather, the data structure of other embodiments may consist of the mappings of 202, but not the mappings of 204. The mappings of 204 (i.e. from an ACL to its direct members) instead may be represented in a separate "members map."

Accordingly, a members map, as used herein, refers to a map from each alias to a list of the alias' direct members. Members maps may be used when processing explicit membership operations, e.g. adding or removing members, as will be described in further detail below. Members maps correspond to mappings that a user controlling data may maintain. For example, a user who creates or maintains ACL_protected-1 (shown in FIG. 2A) may maintain a listing of the direct members of ACL_protected-1.

FIG. 2A lists five documents: doc_Diary, doc_Finances, doc_Vacation, doc_Work1 and doc_Work2. As previously stated, a document, as used herein, may refer to any granularity of data which the operating system is capable of recognizing and manipulating as a distinct entity. Therefore, each of the five documents shown in FIG. 2A may be, for example, a file, a web page, a data package, or an object in a program, e.g. a task in a calendar.

Each document maps to an access control list (ACL). An access control list (ACL) is an example of a specific type of alias that defines a group of users who can access a certain document. The group of users defined by the ACL (or the ACL's direct members) may include one or more users, one or more aliases, or a combination thereof. FIG. 2A shows four ACLs: ACL_private, ACL_protected-1, ACL_protected-2 and ACL_coworkers. Each ACL illustrates a different combination of users and aliases.

ACL_private includes a single user: user_owner. User_owner may be the creator or administrator of doc_Diary, for example. In certain embodiments, user_owner is an identifier (ID) for a user requesting access to a protected document. In other embodiments, user_owner may be an alias consisting of one user (or user ID). That is, user_owner may be a single-user alias.

In certain embodiments of this invention, ACL_private may be a default ACL assigned to a document when the document is first created, received and/or recognized by an access control system in accordance with embodiments of this invention. Other ACLs may also be defined by the system, e.g. an ACL indicating unrestricted (or public) access to documents. Other ACLs may be defined by a user, e.g. ACL_protected-1, ACL_protected-2 or ACL_coworkers. These user-defined ACLs may be private to the creating user, or may be usable, accessible and or modifiable by other users.

ACL_protected-1 includes a plurality of users and a single alias: user_owner, user_accountant and alias_immediate_family. Again, in certain embodiments, user_owner and user_accountant may actually be aliases defining a single user. Alias_immediate_family defines a group of users with common access privileges. For example, each user in alias_immediate_family may have write access to a certain document.

In certain embodiments, a user in one alias (e.g. alias_immediate_family) may also be a user in another alias (e.g. alias_friends). Therefore, a user's membership in an alias (or an aliases' membership in another alias) may be non-exclusive.

ACL_protected-2 includes a single user and a plurality of aliases: user_owner, alias_friends and alias_all_family. In certain embodiments, a user in alias_friends may also be in alias_all_family. Accordingly, an ACL may redundantly indicate that a user has access privileges to a document when the user has membership in multiple aliases. In such a scenario, an intersection between the user's membership list and the ACL would results in more than shared one alias (e.g. more than one alias in common space 103).

Like ACL_protected-1, ACL_coworkers includes a plurality of users and a single alias. However, ACL_coworkers is associated with multiple documents: doc_Work1 and doc_Work2. Accordingly, in certain embodiments, an ACL's association with a document may be non-exclusive. This non-exclusive property allows a user to define an ACL with a potentially long and/or complicated access structure. For example, the ACL may include a large number of users and/or aliases and may have aliases and users embedded several layers deep. Once the ACL is defined, the user may reuse the ACL for other documents.

To allow ACLs (whether system-defined or user-defined) to be reused, certain embodiments may maintain the ACLs separate from the documents. For example, the ACL may not be included in a header to the document but rather in a database. This separate maintenance allows a modification in an ACL to propagate to all documents simultaneously, e.g. without individually accessing and modifying each document's ACLs.

Figure 2B:
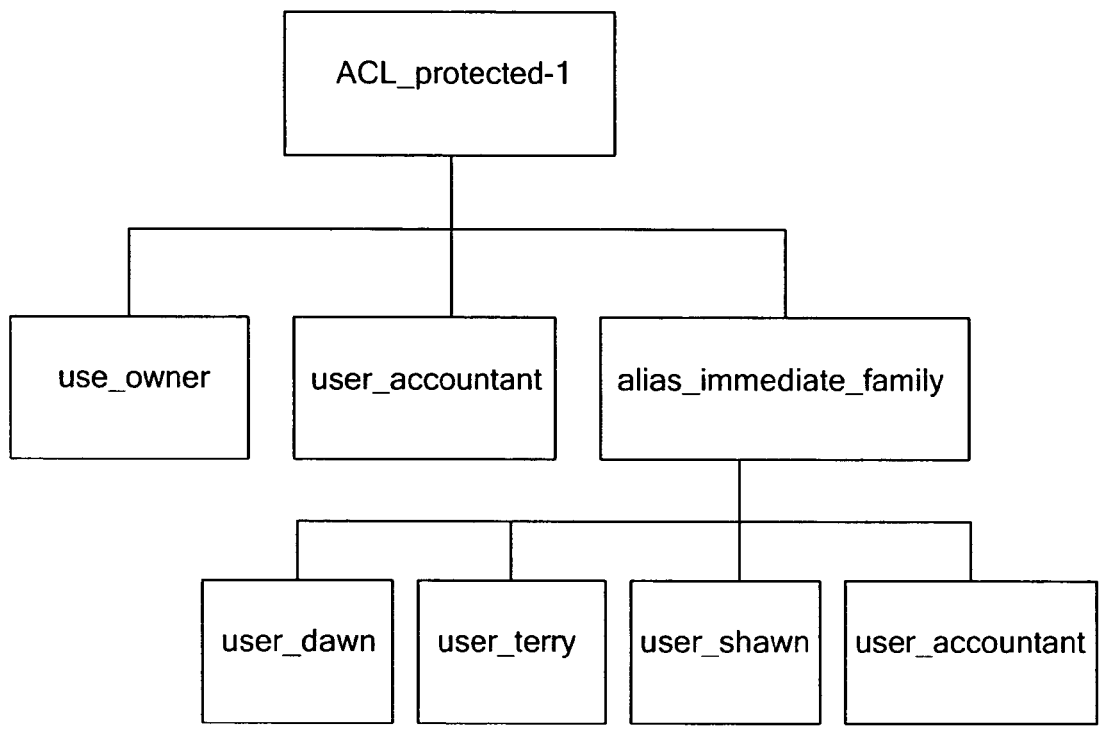

FIG. 2B shows a tree representing a mapping of one ACL of FIG. 2A to its members in accordance with one embodiment of this invention. Specifically, FIG. 2B shows a tree representing a mapping of ACL_protected-1 to its members. As described above, ACL_protected-1 includes both users and aliases. User_owner and user_accountant are direct members of ACL_protected-1. Alias_immediate family is also a direct member of ACL_protected-1. A "members map" keyed to ACL_protected-1 would be a mapping between these two layers, i.e. a mapping between ACL_protected-1 and its immediate children.

The tree of FIG. 2B shows additional relationships for illustrative purposes. Specifically, the tree of FIG. 2B shows the members of alias_immediate_family. The members of alias_immediate_family are considered indirect members of ACL_protected-1. Specifically, user_dawn, user_terry, user_shawn, and user_accountant are considered indirect members of ACL_protected-1, but direct members of alias_immediate_family. Accordingly, in certain embodiments, the membership lists for user_dawn, user_terry, user_shawn and user_accountant may include both alias_immediate family and ACL_protected-1, as will be described in further detail below.

Figure 2C:
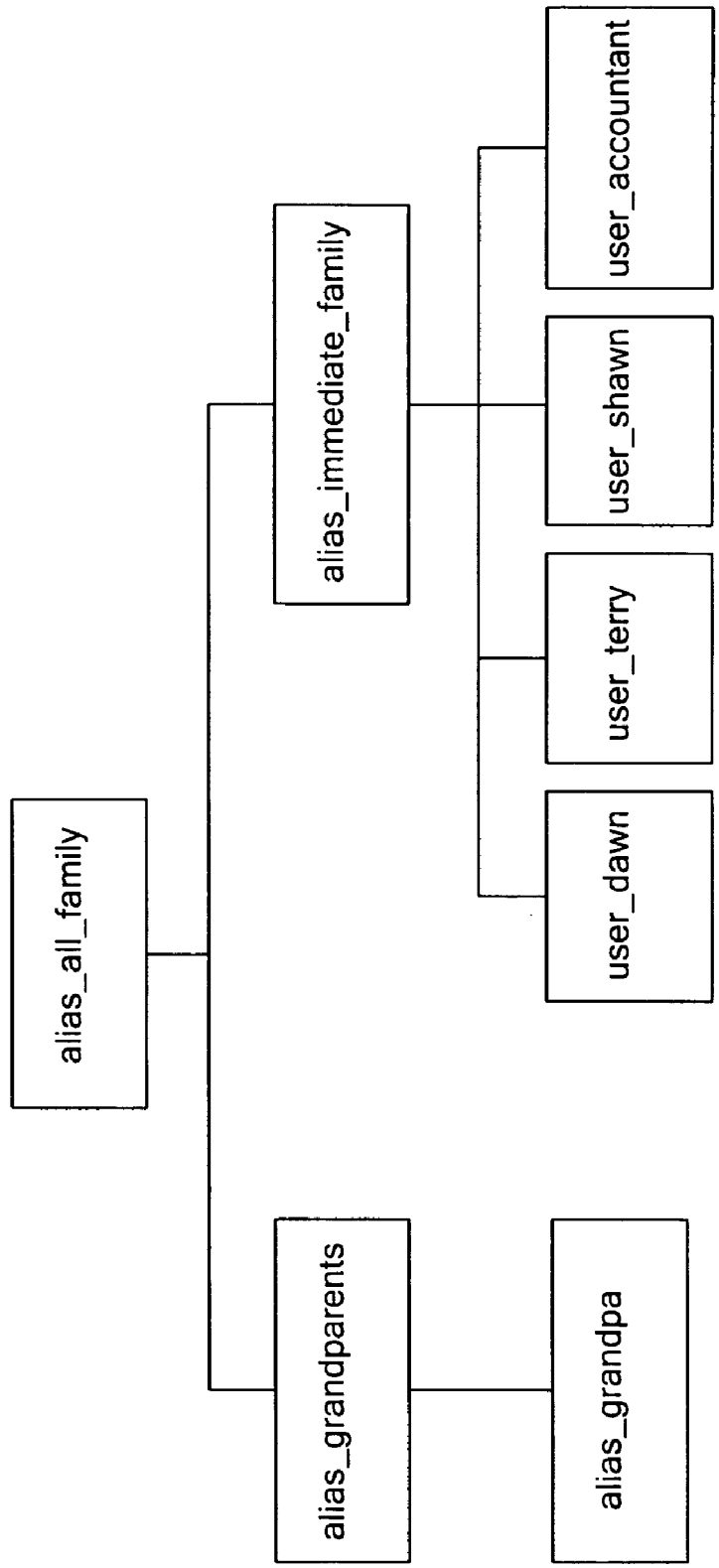

FIG. 2C shows a tree representing a mapping of an alias of FIG. 2A to its members in accordance with one embodiment of this invention. Because an ACL is an example of a specific type of alias, the tree of FIG. 2C is similar to the tree of FIG. 2B. Specifically, alias_all_family may include both users and other aliases. Here, alias_all_family includes two aliases as direct members: alias_grandparents and alias_immediate family. The members of each of these aliases are considered indirect members of alias_all_family. Therefore, user_dawn, user_terry, user_shawn, user_accountant and user_grandpa are considered indirect members of alias_all_family, but direct members of their respective aliases (i.e. alias_immediate_family and alias_grandparents). Accordingly, in certain embodiments, the membership list for user_dawn, user_terry, user_shawn and user_accountant may include alias_immediate_family and alias_all_family, while a membership list for user_grandpa may include alias_grandparents and alias_all_family.

As previously indicated and as can be seen in FIG. 2C, an alias can include a single member. Specifically, alias_grandparents includes a single member, user_grandpa. This is analogous to ACL_private containing the single member user_owner in FIG. 2A, or embodiments in which user_dawn is an alias for a single user (or user ID).

FIG. 2D shows a table representing mappings from users and/or aliases to other aliases to which the users and/or aliases directly belong in accordance with one embodiment of this invention. FIG. 2D may be considered a "direct membership map." Direct membership maps, like members maps, may be used when processing explicit membership operations, e.g. adding or removing members, as will be described in more detail below.

In one sense, direct membership maps are inverses of members map. Where members maps may provide listings of immediate child nodes, direct membership maps may provide listings of immediate parent nodes. Accordingly, in FIG. 2D, user_dawn is mapped to its immediate parent node, alias_immediate_family. However, direct membership maps may not be a one-to-one inverse of members maps since a user (or an alias) may be a member of several aliases, and therefore have several immediate parents. Therefore, a user's (or alias') direct membership in other aliases may not be readily seen by examining a members map.

Users may be direct members of aliases. For example, in FIG. 2D, user_dawn is a direct member of alias_immediate_family. Since an ACL is a specific type of alias, users may also be direct members of an ACL. For example, in FIG. 2D, user_paul is a direct member of ACL_coworkers. When a user is direct member of an ACL and also a direct member of alias that is a member of the ACL, the user is considered both a direct and indirect member of the ACL. For example, user_accountant is considered both a direct and indirect member of ACL_protected-1 since alias_immediate_family is a member of ACL_protected-1.

FIG. 2E shows a mapping of both direct and indirect memberships. Specifically, FIG. 2E shows a table representing a mapping between users and their membership lists in accordance with one embodiment of this invention. A membership list indicates aliases to which a user belongs, either directly and indirectly. Therefore, a user's membership list may be considered a listing of all the user's ancestor aliases. Membership lists may be determined prior to and independent of data requests. For example, a membership list may be generated when the user is initially given a username in the system.

Embodiments of this invention may access membership lists frequently to determine if a user has access privileges to a document. As noted above, embodiments of this invention may intersect a user's membership list with a document's ACL to determine if the user can access the document. Because "membership maps" (e.g. the map of FIG. 2E) may be accessed frequently to retrieve membership lists, membership maps may be stored as a cache. Additionally, membership maps may be divided and stored distributively across several machines (e.g. by sharing).

A membership list is not stagnant, however, and may change as a user gains or loses membership to various aliases (or ACLs). When a user's membership in an alias changes, the membership list may be invalidated and recomputed. When an alias' membership in another alias changes, membership lists which include the first alias may also be invalidated and recomputed. Therefore, membership lists may be invalidated when relationships between users and aliases change, when relationships between aliases and other aliases change, or when relationships between users/aliases and ACLs change.

A user's membership list accounts for the user's direct and/or indirect membership in aliases. For example, as noted above, user_accountant is a direct member of alias_immediate_family and an indirect member of alias_all_family. The membership lists abstracts away from this direct/indirect relationship. Because a user can access a document when the user is either a direct or indirect member, direct/indirect membership information may not be dispositive of access to the document. Therefore, embodiments of this invention abstract away that information, which may thereby reduce the time spent determining if a user has access privileges to a document.

Figure 2F:
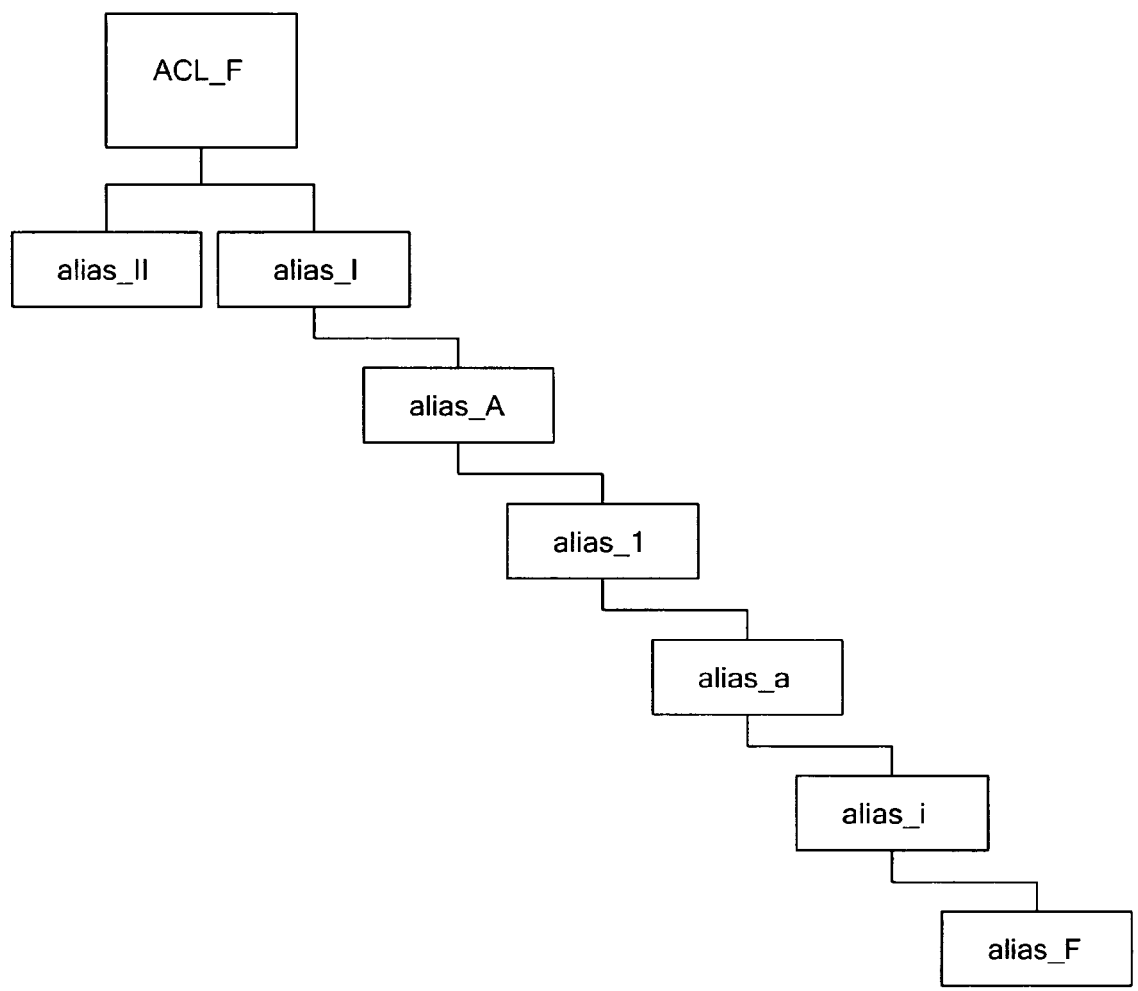

This benefit is more readily understood with reference to FIG. 2F. FIG. 2F shows a mapping between an ACL and aliases embedded several layers deep in accordance with one embodiment of this invention. A document associated with ACL_F may be accessible by members of alias_I, which includes alias_A, which includes alias_1, which includes alias_a, which includes alias_i. Each alias may be stored in a different machine. A user_F may be a direct member of the alias_i, and therefore an indirect member of alias_a, and so forth. The user therefore has access to the document because the user is an indirect member of alias_I, despite the several degrees of separation. A membership list for this user would include alias_i, . . . alias_I, thereby abstracting away the direct/indirect membership characteristic.

Figure 2G:
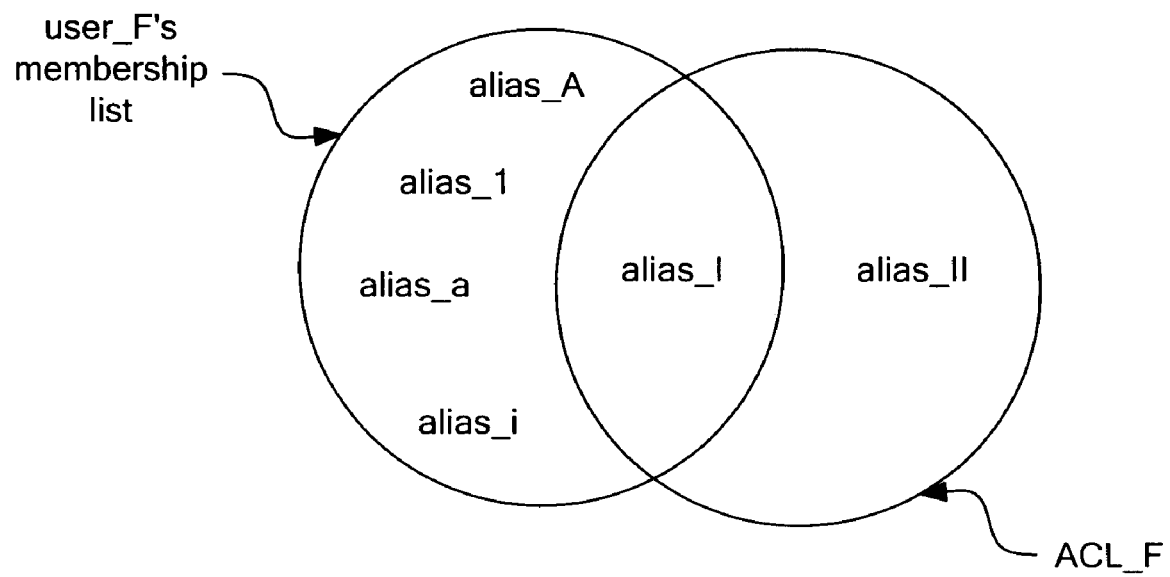

FIG. 2G is a diagram of an ACL intersecting a membership list consistent with FIG. 2F in accordance with one embodiment of this invention. As can be seen from FIG. 2G, embodiments of this invention may determine if user_F has access to a document associated with ACL_F by intersecting user_F's membership list with ACL_F. As can be seen from FIG. 2G, ACL_F and user_F's membership list share alias_I in common. Therefore, user_F has access privileges to documents associated with ACL_F. Accordingly, recursive analysis of each embedded alias in search of user_F is avoided by using embodiments of this invention. This may significantly reduce the time spent determining whether a given user can access a given document.

In certain embodiments consistent with FIG. 2G, before the membership list and ACL are intersected, the ACL may be analyzed to determine if the user is a direct member of the ACL. Such a process is described in more detail with reference to FIG. 4B. This ACL analysis may occur, for example, if user_dawn is a user ID rather than an alias. When user_dawn is a user ID, the user ID may not be listed as part of the user's membership list. Therefore, an intersection of the user's membership list and the ACL may not reveal user_dawn's direct membership in the ACL, and therefore user_dawn may be denied access to the document. Analyzing the ACL to determine if a user is a direct member first avoids this denial. In certain embodiments, this denial may be avoided in other ways. For example, in certain embodiments, the user ID may be included in the membership list even though the user ID may not technically be an alias. An intersection of such a membership list and an ACL would not be empty, thereby avoiding the denial described above.

FIG. 2H shows another table representing a mapping between users and their membership lists in accordance with another embodiment of this invention. In FIG. 2H, the membership lists includes ACLs to which users belongs, either directly and indirectly. In embodiments having such membership lists, the user's membership list may be searched to determine if the document's ACL is listed. Such a process is described in more detail with reference to FIG. 4C. In embodiments consistent with either FIG. 2E or FIG. 2H, real-time recursive analysis of each alias embedded in an ACL in response to a request for access to a document associated with the ACL is avoided.

Note that in FIG. 2H, user_accountant and user_dawn appear to have identical membership lists. However, as can be seen from considering FIG. 2D, user_accountant and user_dawn have slightly differing membership characteristics. Specifically, user_accountant is a direct member of alias_immediate_family, an indirect member of alias_all_family, and both a direct and indirect member of ACL_protected-1. User_dawn is also a direct member of alias_immediate_family and an indirect member of alias_all_family. However, user_dawn is an indirect member of ACL_protected-1, but is not a direct member. Therefore, although user_accountant and user_dawn have non-identical relationships with ACL_protected-1, their membership lists appear identical. As in FIG. 2E, in FIG. 2H, information that may not be dispositive of access (e.g. direct and indirect membership characteristics) are abstracted away by the membership list.

Figure 3A:
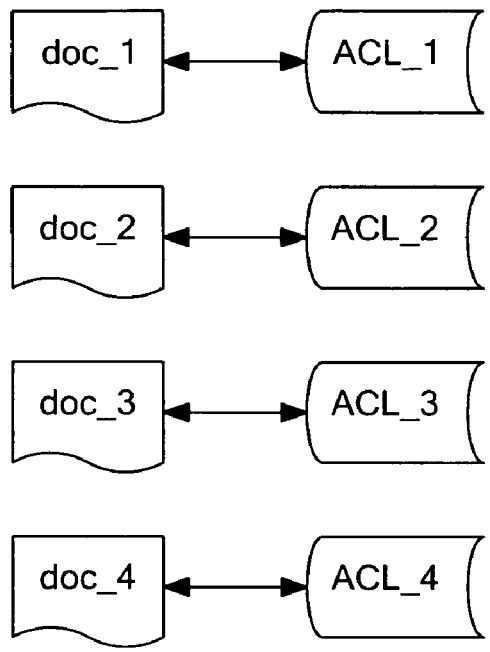
FIGS. 3A-3D show relationships between documents and ACLs in accordance with embodiments of this invention.
Figure 3B:
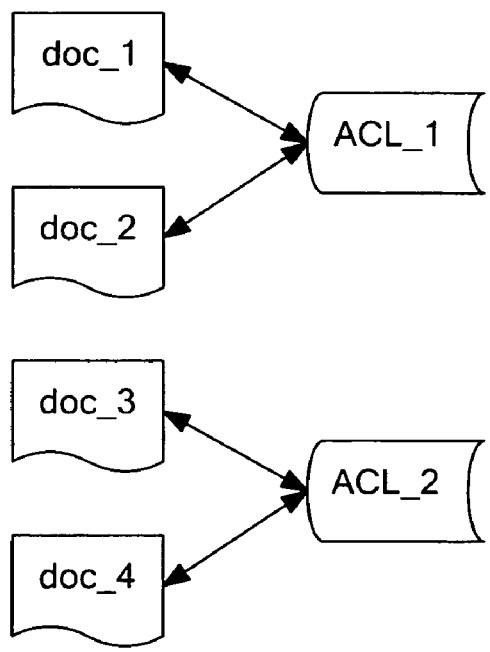
Figure 3C:
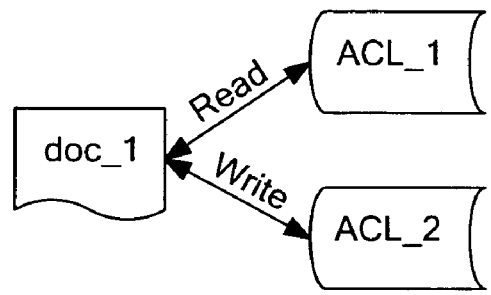
Figure 3C:
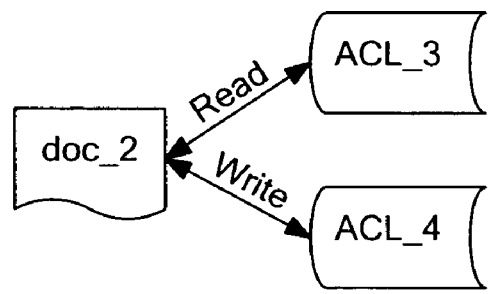

FIGS. 3A-3D show relationships between documents and ACLs in accordance with embodiments of this invention, including the many-to-one relationship between the documents and ACL described with regard to FIG. 2A, above. As shown by FIG. 3A, a single ACL may define a group of users for a single document in a one-to-one relationship. A single ACL may also define a group of users for more than one document in a one-to-many relationship, as shown in FIG. 3B and described above with regard to FIG. 2A. Additionally, a single ACL may define specific types of access for a single document as shown in FIG. 3C. For example, a single ACL may define read access for a document, while another ACL may define write access for that same document, thereby creating a many-to-one relationship.

Figure 3D:
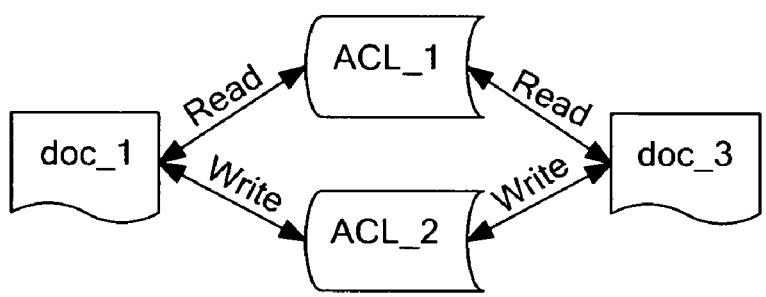
Figure 3D:
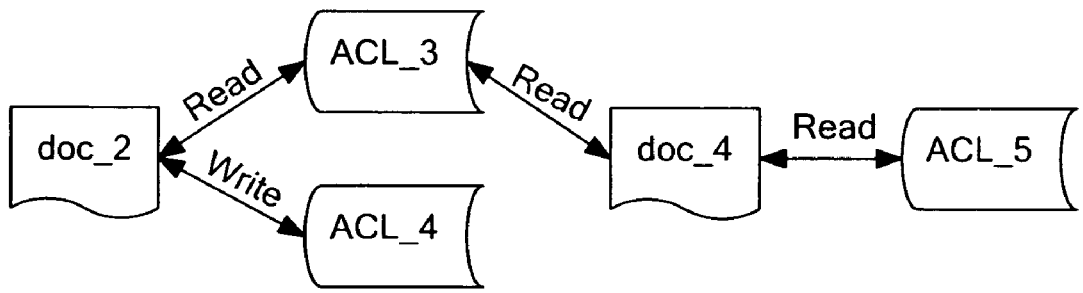

FIG. 3D illustrates that a single ACL may also define specific types of access for more than one document, thereby creating a many-to-many relationship. For example, ACL_1 defines users who are to have read access to doc_1 and doc_3 while ACL_2 defines users who are to have write access to doc_1 and doc_3. ACL_3, on the other hand, defines users who are to have read access to doc_2 and write access to doc_4. ACL_4 defines users who are to have write access to doc_2, while ACL_5 defines users who are to have read access to doc_4. Therefore, documents may have a combination of one-to-one, one-to-many, many-to-one, and many-to-many relationships with ACLs.

Using the mappings described above in FIGS. 2A-2H, various embodiments of a method and system for controlling access to documents are described below.

Architecture and Process

Figure 4A:
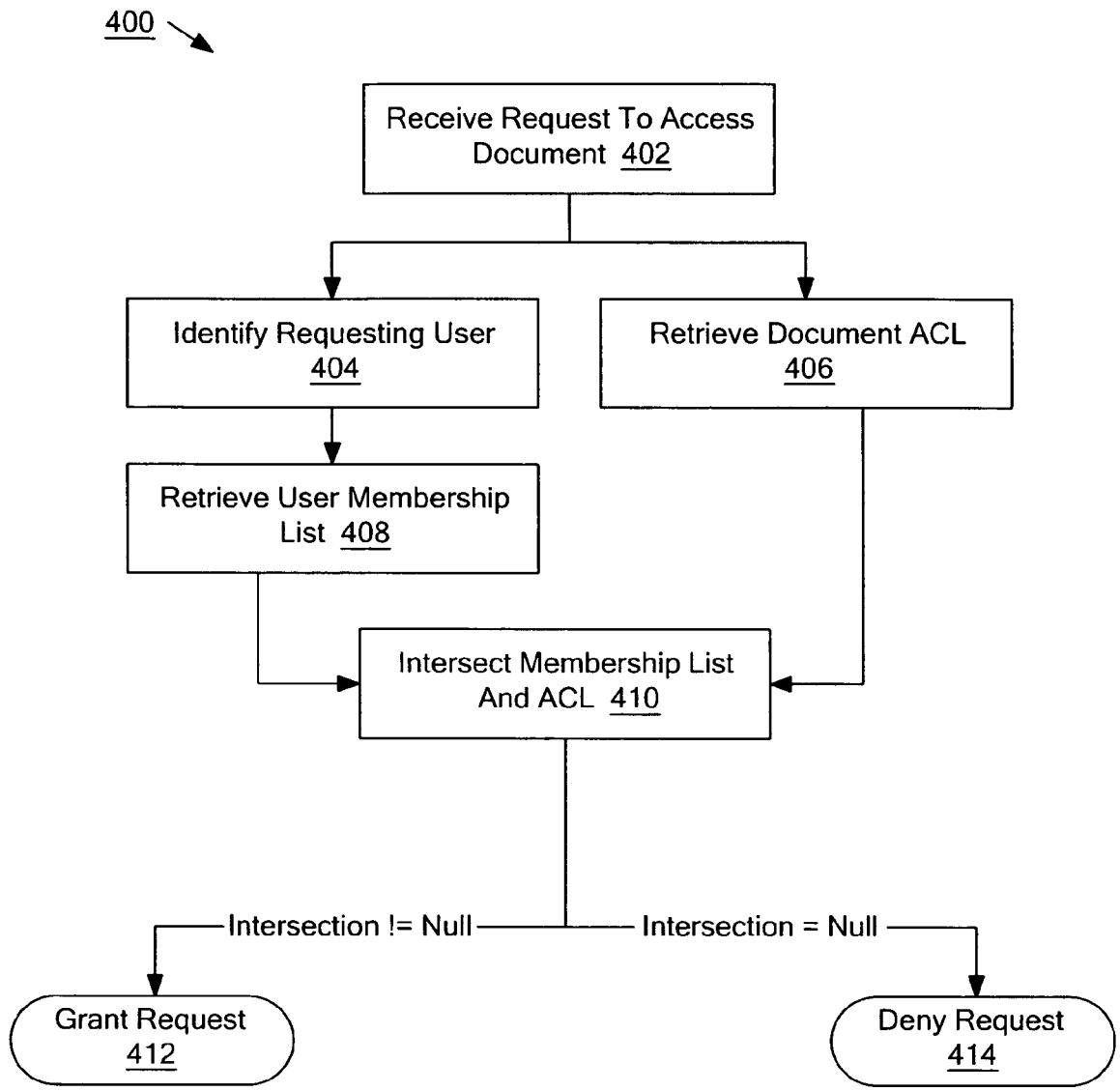
FIG. 4A shows one process to determine when a user can access a document in accordance with one embodiment of this invention.

FIG. 4A shows one process to determine when a user can access a document in accordance with one embodiment of this invention. At 402, a request to access a document is received. This request may be via a network, as described with reference to FIG. 8 for example, or via an interconnect, as described with reference to FIG. 9.

At 404, the user requesting the document is identified. For example, a value in the request may indicate a username that may be mapped to a user ID. This value may be extracted from the request. The request may also be part of a larger request (e.g. a request to search for a document, as described in further detail with reference to FIGS. 6 and 7).

At 406, the document's access control list is retrieved. For example, an ACL map stored in a cache or memory may be accessed to determine the ACL associated with the document identified in the request.

At 408, the user's membership list is retrieved. In certain embodiments, the membership list is stored in the same machine that receives the request to access the document. Therefore, in those embodiments, the user's membership list may be retrieved over a computer bus, as described in more detail below. In other embodiments, the membership list may be stored a different machine and retrieved over a network connection, as is also described in more detail below.

In FIG. 4A, the identification of the user at 404 and the retrieval of the membership list at 408 are performed while the document's ACL is being retrieved at 406. For example, in one embodiment, a system performing these operations may issue two processing threads asynchronously: one thread to identify the user and retrieve the membership list and one thread to retrieve the ACL. In other embodiments, these operations may occur sequentially. That is, first the user may be identified and the user's membership list retrieved, then the document's ACL may be retrieved. Alternatively, first the document's ACL may be retrieved, then the user may be identified and the user's membership list retrieved.

At 410, the user's membership list and the document's ACL are intersected to determine if the list and ACL share at least one alias. As previously noted, an access control list (ACL) identifies users and aliases which can access certain data. If the intersection is not null, then the list and ACL have at least one alias in common. As previously described, a non-null intersection indicates that the user is either a direct or indirect member of at least one alias which has access to the document. Therefore, the user's request to access the document is granted at 412.

If the intersection between the user's membership list and the document's ACL is null, however, the user is neither a direct nor indirect member of aliases listed in the document's ACL. Therefore, the user does not have access privileges to the document, and the request to access the document is denied at 414.

As previously noted and as can be understood from FIG. 4A, the user's membership list is computed prior to and independent of the user's request for data. Therefore, when the document is requested, embodiments of this invention may quickly determine if the user has access to the document. Real-time recursive searching of each (embedded) alias in a document's ACL to determine when a user can access a document may be avoided. Real-time retrieval of aliases potentially stored on disparate machines may also be avoided.

Embodiments consistent with FIG. 4A may include the user's ID in the user's membership list or provide for single-user aliases identifying the user in the membership lists. As described above, these alternatives avoid denial of access to users who are direct members of ACLs. In embodiments in which neither of these alternatives is implemented, a process similar to the one of FIG. 4B may be used.

Figure 4B:
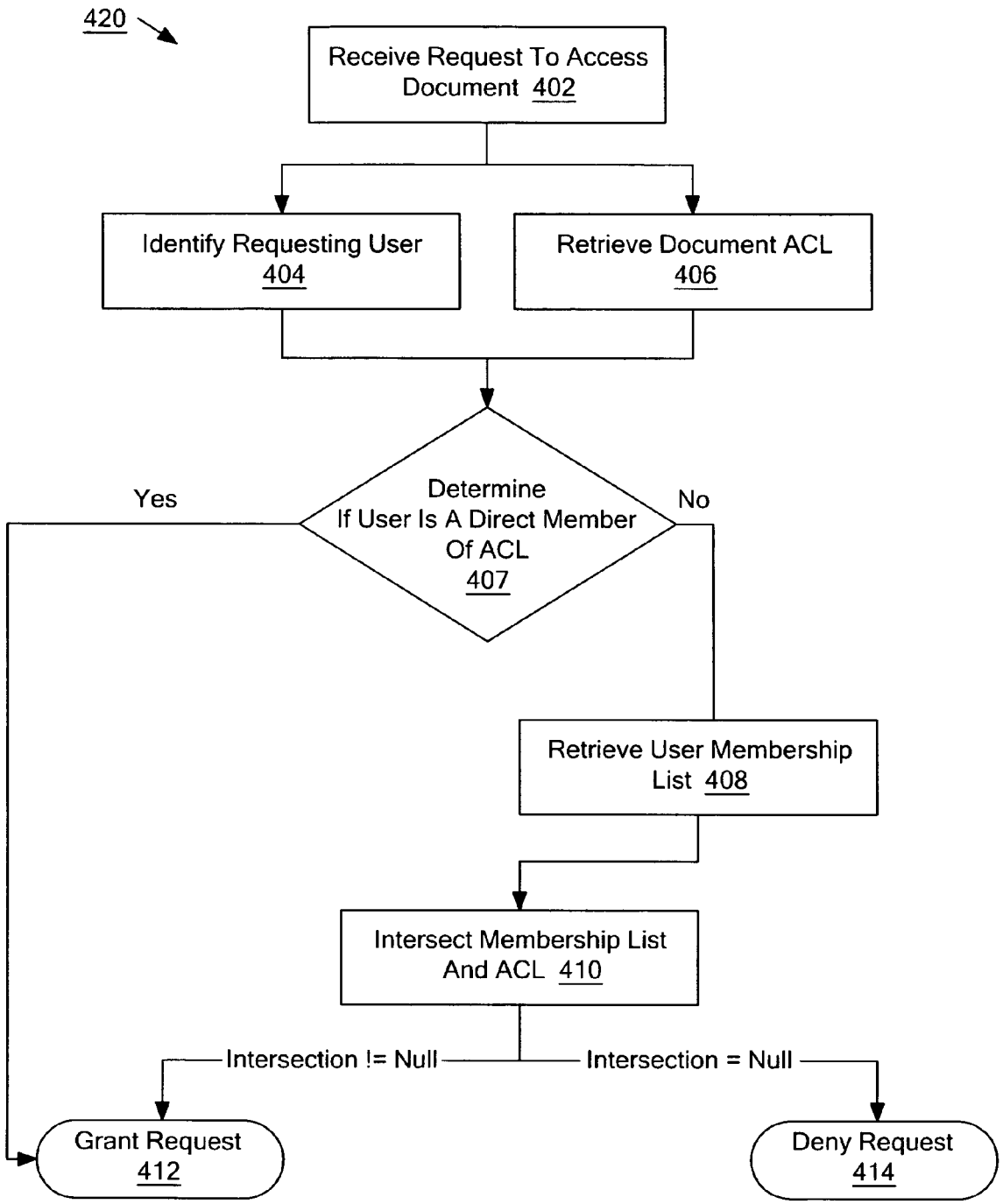
FIG. 4B shows another process to determine when a user can access a document in accordance with one embodiment of this invention.

FIG. 4B shows another process to determine when a user can access a document in accordance with one embodiment of this invention. As in FIG. 4A, in FIG. 4B, a request to access a document is received at 402. At 404, the user requesting the document is identified and, at 406, the document's access control list is retrieved.

In the embodiment shown in FIG. 4B, the identification of the use and the retrieval of the document's ACL are performed simultaneously. That is, while the user is identified, the document's ACL is retrieved. Accordingly, similar to the discussion of FIG. 4A above, in one embodiment, a system performing these operations may issue two processing threads asynchronously: one thread to identify the user and one thread to retrieve the ACL. In other embodiments, these operations may occur sequentially. That is, first the user may be identified and then the document's ACL retrieved, or first the document's ACL may be retrieved and then the user identified. However, in FIG. 4B, the user's membership list is not retrieved (if at all) until after the ACL is examined at 407.

At 407, the ACL is examined to determine if the user is a direct member of the ACL. For example, a processor may scan the ACL for the user's ID. If the user appears in the ACL, the user has access privileges (or can access) to the document associated with the ACL. If the user is a direct member of the ACL, then the request to access the document in granted at 412.

If the user is not a direct member of the ACL, then the user's membership list is retrieved at 408. As in FIG. 4A, at 410, the user's membership list and the document's ACL are intersected to determine if the list and ACL share at least one alias. If the intersection is not null, then the list and ACL have at least one alias in common. Therefore, the user's request to access the document is granted at 412. If the intersection between the user's membership list and the document's ACL is null, however, the user does not have access privileges to the document, and the request to access the document is denied at 414.

In FIG. 4B, as in FIG. 4A, real-time recursive computation is avoided. Also in FIG. 4B, as in FIG. 4A, retrieval of aliases stored in disparate locations is avoided.

Figure 4C:
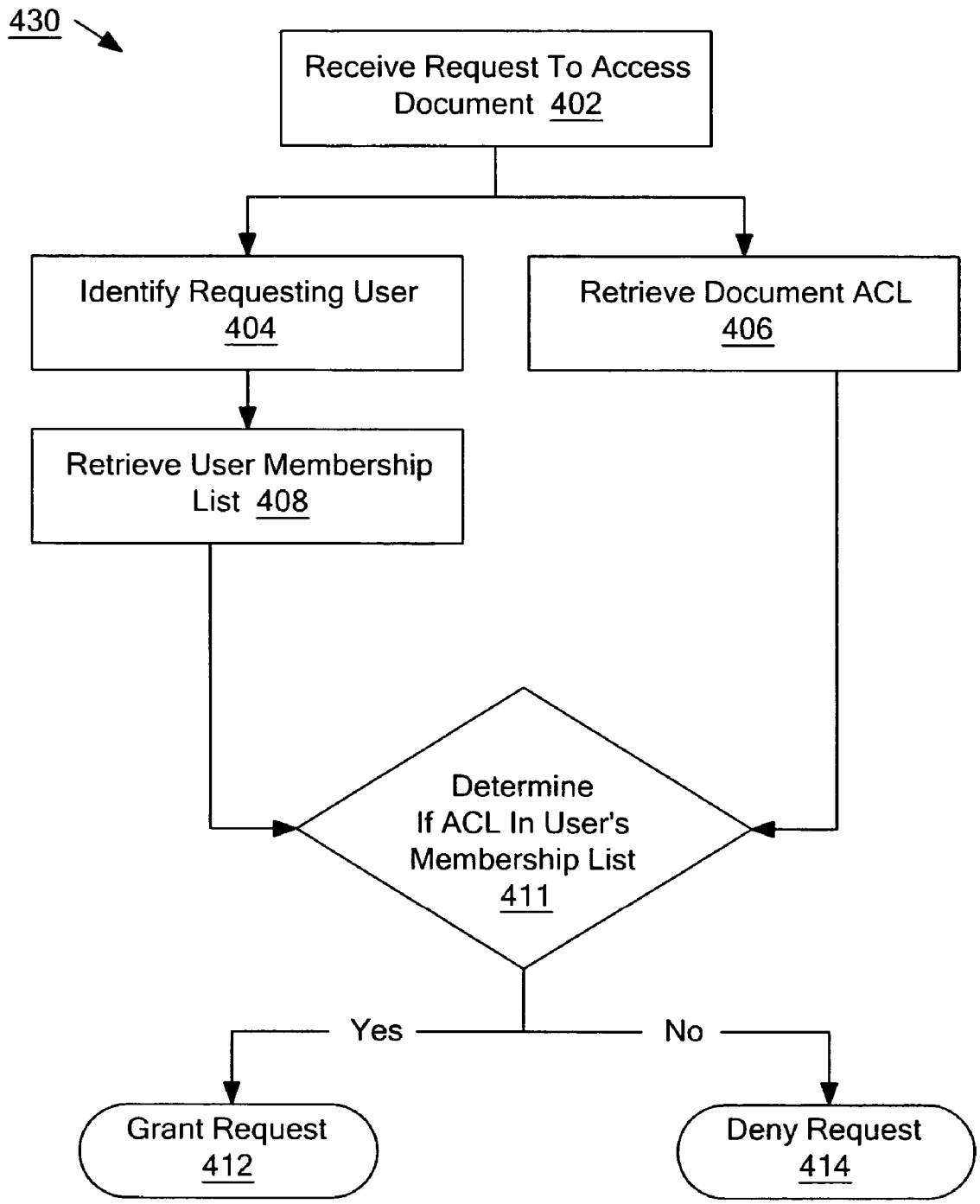
FIG. 4C shows another process to determine when a user can access a document in accordance with one embodiment of this invention.

FIG. 4C shows another process to determine when a user can access a document in accordance with one embodiment of this invention. As in FIGS. 4A and 4B, in FIG. 4C, a request to access a document is received at 402. At 404, the user requesting the document is identified and, at 406, the document's access control list is retrieved. At 408, the user's membership list is retrieved.

As in FIG. 4A, in FIG. 4C, the identification of the user at 404 and the retrieval of the membership list at 408 are performed while the document's ACL is being retrieved at 406. As in FIG. 4A, these operations may occur sequentially.

The process shown in FIG. 4C corresponds to embodiments of this invention that use membership lists such as the ones shown in FIG. 2H. Specifically, the membership lists of FIG. 2H include ACLs in which a user is either a direct or indirect member. Therefore, unlike in FIG. 4B, in FIG. 4C, a determination of whether a user is a direct member of an ACL is not made before retrieving the user's membership list. Rather, as in FIG. 4A, in FIG. 4C, once the user is identified, the user's membership is retrieved.

At 411, a determination of whether the ACL appears in the user's membership list is made (e.g. by scanning the list). If the ACL appears in the list (i.e. ACL ∈ membership list), then the request to access the document is granted at 412. If the ACL does not appear in the list (i.e. ACL ∉ membership list), then the request to access the document is denied at 414. An intersection of the membership list and the ACL may or may not be made to determine if the ACL appears in the membership list. An intersection of the membership list and the ACL may be made if the ACL includes an alias to itself in its members list (analogous to the user including a single-user alias to the user in the user's membership list).

Again, as in FIGS. 4A and 4B, in FIG. 4C, real-time recursive computation is avoided. Also as in FIGS. 4A and 4B, in FIG. 4C, retrieval of aliases stored in disparate locations is also avoided.

Figure 5A:
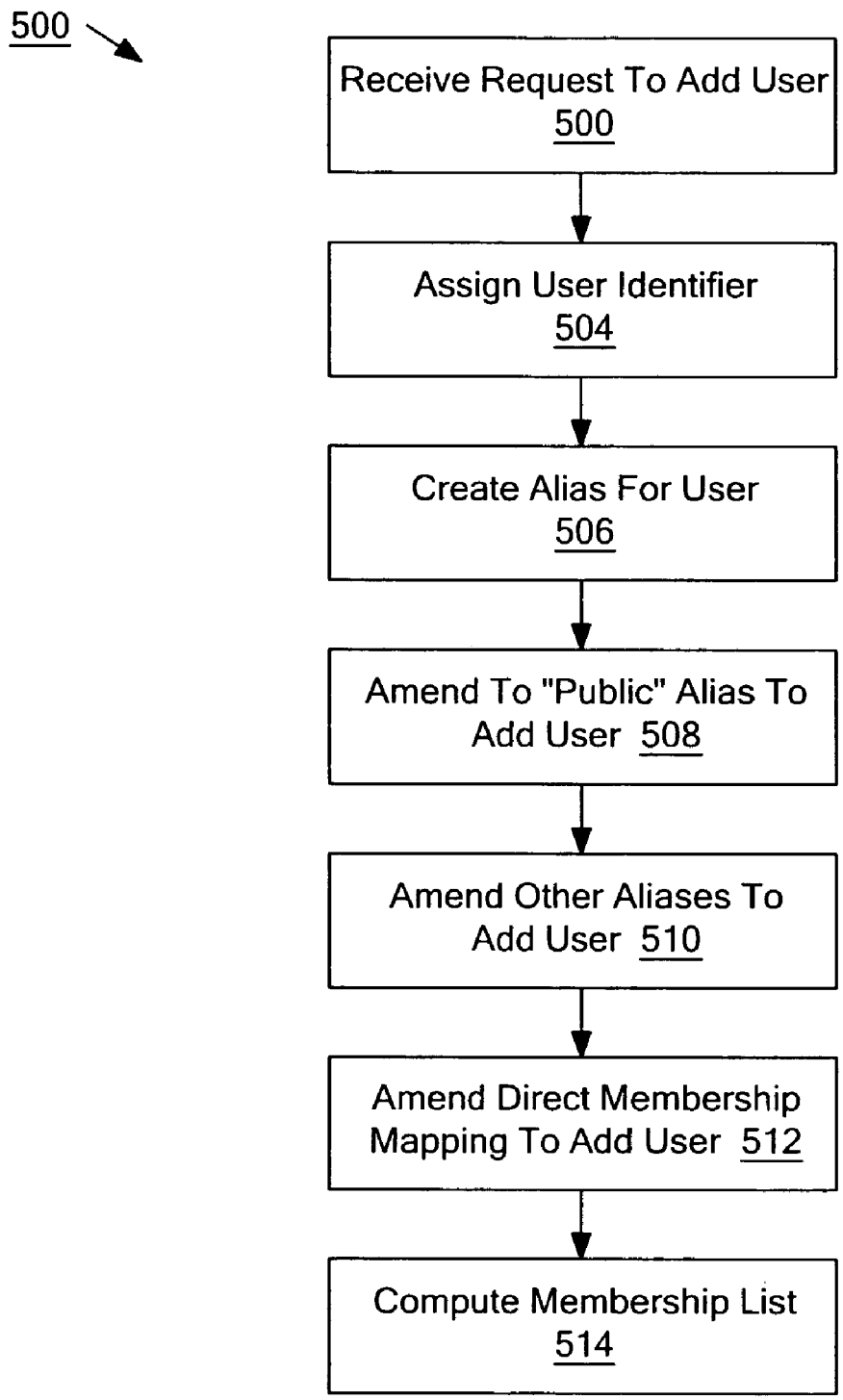
FIG. 5A shows a process to add a user to an access control system in accordance with one embodiment of this invention.

FIG. 5A shows a process to add a user to an access control system in accordance with one embodiment of this invention. At 502, a request is received to add a user to the access control system. As described in more detail below, this request may be over a network. For example, this request may be from a client, e.g. a home computer or a web application.

At 504, the user is assigned an identifier. In certain embodiments, the identifier is a username. In other embodiments, the identifier may be a unique index value, e.g. a value of a global counter incremented each time a user is added to the system. In certain embodiments, a mapping is maintained from the identifier and the user name. This mapping may be access when a user is identified (e.g. at 404).

At 506, an alias is created for the user. This alias may consist only of the user and be used to identify the user in ACLs. For example, in FIG. 2A, user_owner may actually be an alias for a user that owns (e.g. created and/or administers) the document. When single user aliases are used in an access control system, the process of FIG. 4A may be used to identify when a user has access to a document. Each user may be a member of an alias consisting of the user alone (a single-user alias). When the user is a direct member of the ACL, the user's single-user alias will be listed in the ACL as a direct member. When the membership list and the ACL are intersected to determine if the list and ACL share an alias in common, the intersection will not be null. The user will be a direct member of the alias and the alias will be a direct member of the ACL. Therefore, the user will be an indirect member of the ACL via the single user alias. An intersection of the ACL and the user's membership list will produce a non-null set of at least the single-user alias. Accordingly, a separate analysis of the ACL (e.g. scanning the ACL for the user) before retrieval of the membership list (such as in FIG. 4B) may be avoided.

At 508, the "public" alias may be amended to add the user. This alias includes all members of the access control system. In certain embodiments, this alias may also include an "anonymous" user (e.g. for assignment to requests from anonymous sources, e.g. web clients). An ACL which includes the "public" alias provides unrestricted access to the document. This unrestricted access may apply to certain types of access but not others, however. For example, unrestricted read access may be provided but write access may be restricted. As previously noted, multiple ACLs may be used to implement varying access control, such as in FIG. 3C, for example. In certain embodiments, the operation at 508 may be omitted.

At 510, other aliases may be amended to add the user. For example, if the user is a new employee of a company, the user may be added to alias_coworkers. A mapping such as 204 in FIG. 2A may be accessed and amended to add the user. For example, if the members map of 204 is stored in a database table, a command may be sent to the database to amend certain rows to add the user (or the user's alias) as a member of the alias (or ACL).

At 512, a direct membership mapping (e.g. shown in FIG. 2D) is amended to add the user. For example, if the direct membership map of FIG. 2D is stored in a database table, a command may be sent to the database to add a row to a table keyed to users (or users' IDs or aliases). The key may then be associated with the aliases from 508 and 510. In certain embodiments, this direct membership mapping is amended simultaneously with or before the operations at 508 and 510 rather than after.

At 514, the user's membership list is computed. In certain embodiments, this membership list is computed by recursively following the aliases in the direct membership mapping (amended at 512). For example, if the new user is user_terry in FIG. 2D, then user_terry's membership list in FIG. 2E would include alias_immediate_family, in which user_terry has direct membership. Alias_immediate_family may be followed to reveal membership in alias_all_family, and so forth.

As previously indicated, this membership list may be recomputed each time membership changes, including when the user is added or removed from an alias and when an alias (in the user's membership list) is added or removed from another alias.

For example, a request may be received to remove a user from alias_coworkers. In response to the request, a members map may be amended to remove the user as a member of the alias. A direct membership map may also be amended to remove the alias from the user's direct membership list. The user's membership list may then be invalidated and recomputed to reflect the new status.

Another request may be received to remove an alias from another alias. For example, the request may be to remove alias_grandparents from alias_all_family. A members map may be amended to remove alias_grandparents as a member of alias_all_family. A direct membership map may also be amended to remove alias_all_family from alias_grandparents direct membership list. All users having alias_grandparents in their membership lists may have their membership lists invalidated. The membership lists may then be recomputed to reflect the new status.

In certain embodiments, invalidated membership lists are not recomputed until after a request from the user associated with the membership is received. Accordingly, if the user is an inactive (or relatively inactive user), resources may not expended to recompute the user's membership status until the user becomes active. The request may be a specific request to recompute the membership list. The request may also or alternatively be a request for access to the membership list (e.g. a request for access to a document as part of a search).

Figure 5B:
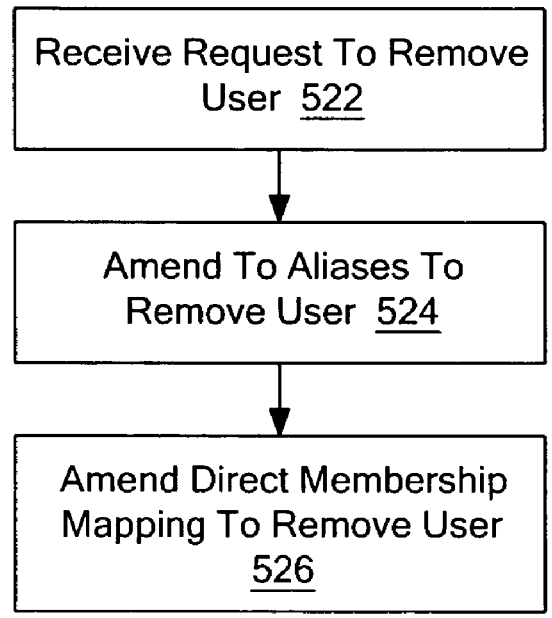
FIG. 5B shows a process to remove a user to an access control system in accordance with one embodiment of this invention.

FIG. 5B shows a process to remove a user to an access control system in accordance with one embodiment of this invention. At 522, a request to remove the user is received. Similar to FIG. 5A, this request may be via a network (e.g. a home computer or a web application), as will be described in more detail below. At 524, aliases are amended to remove the user. For example, in the mapping of 2A or 2D, rows may be amended to remove the user from lists. At 526, the user's membership is removed. For example, a row in the tables of FIG. 2E or 2H may be removed.

In the process to remove a user of FIG. 5B, membership lists are not recomputed. However, as previously indicated, if instead of deleting a user, an alias is deleted, membership lists may be invalidated and recomputed, as described above.

Figure 6:
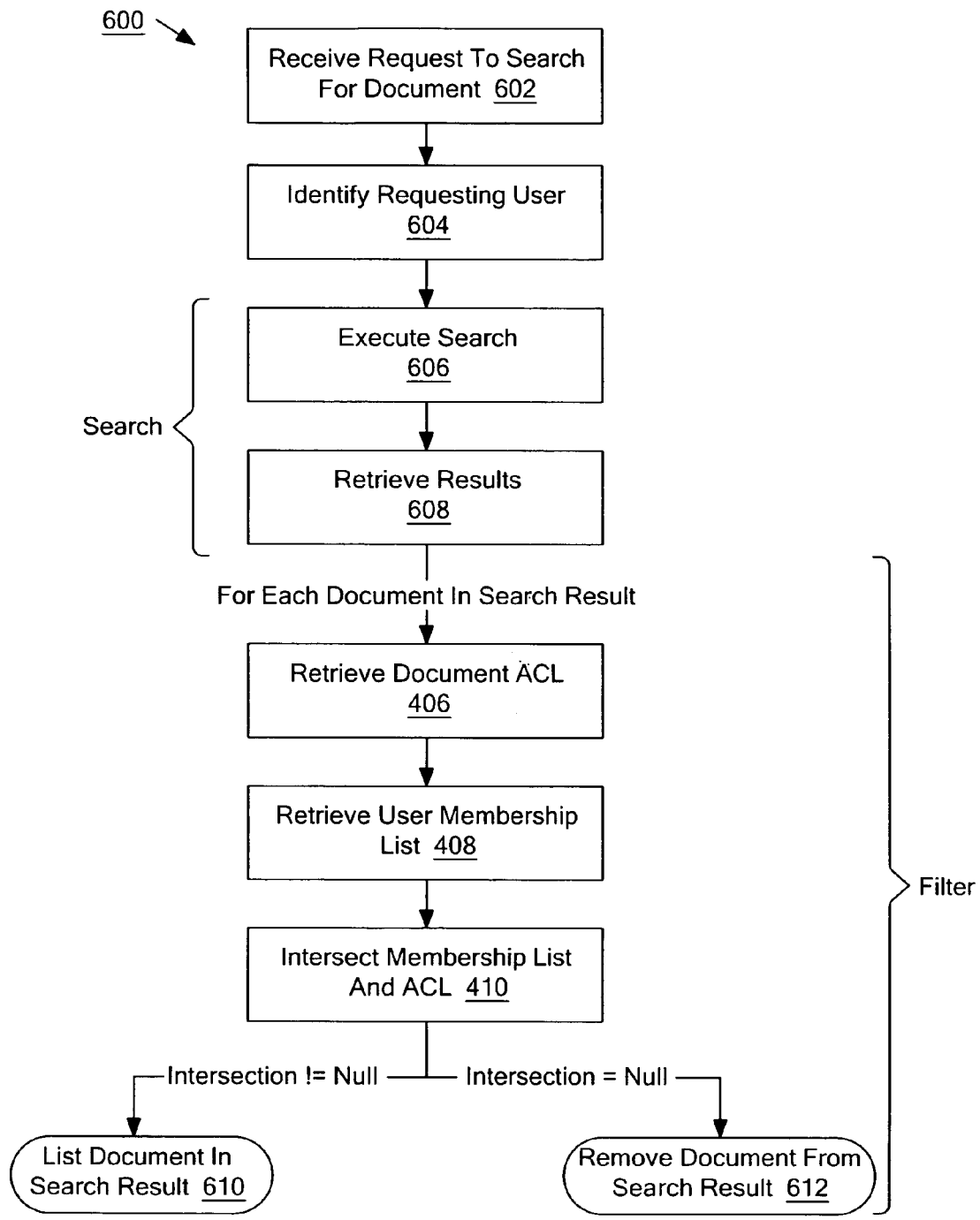
FIG. 6 shows an operation of an access control system in accordance with one embodiment of this invention.

FIG. 6 shows an operation of an access control system in accordance with one embodiment of this invention. Specifically, in FIG. 6, search results are filtered based on the user's access privileges before being transmitted to a user. At 602, a request to search for a document is received. The request may be to search for a document by name, address or some other unique identifier, for example. The request also may be to search for documents matching certain criteria. For example, the request may include search terms (e.g. keywords). Documents (or a list of documents) having those terms (or similar terms) may be returned. Other criteria may also be used.

At 604, the user requesting the search is identified. The user may be identified by extracting a value transmitted as part of the request, for example. In certain embodiments, this value may be used as a key to a table which stores the user's identification in the access control system, as suggested above.

At 606, the search is executed. The execution may include searching an index of documents. The index may be divided into subunits and each subunit may be stored on a different machine. The documents may also be stored in a plurality of machines. Therefore, the search may include communications beyond an internal computer bus. The communications may include communications across one or more networks, as described in further detail below.

At 608, the results of the search are retrieved. The results may be in the form of a list of documents meeting the search criteria, for example. Before these results are transmitted to the requesting user, however, the results are filtered. As shown in FIG. 6, for each document in the search result, the user's access privileges to the document are determined. If the user does not have access privileges (e.g. the user cannot access a document), the document is removed from the results. Therefore, the search results will not display documents which the user cannot access. This allows the security of confidential documents to be maintained since existence of the document will not be revealed.

In certain embodiments, if the user has partial access to the documents (e.g. the user may read but not write to the document), the documents may not be filtered from the results. If the user subsequently requests the document, the document may be delivered to the user in read-only mode, for example.

To filter the search results, the ACL for each document in the result is retrieved. As in FIG. 4A, the user's membership list is retrieved at 408 and intersected with the document's ACL at 410. As previously described, if the intersection is not null, then the user has access to the document. The document is therefore listed in the search result at 610.

In certain embodiments, the search result may be presented in a web page. For example, the search result may list the document with or as a hypertext link to the storage location of the document. In other embodiments, the search result may be presented as part of a list. The document may then be access by issuing commands (e.g. command-line commands) to retrieve the document.

If the intersection is null, on the other hand, the user does not have access to the document. The document is removed from the search results at 612. Although FIG. 6 incorporates the process described in FIG. 4A, it shall be appreciated that the process described in FIG. 4B or 4C may also be used.

Figure 7:
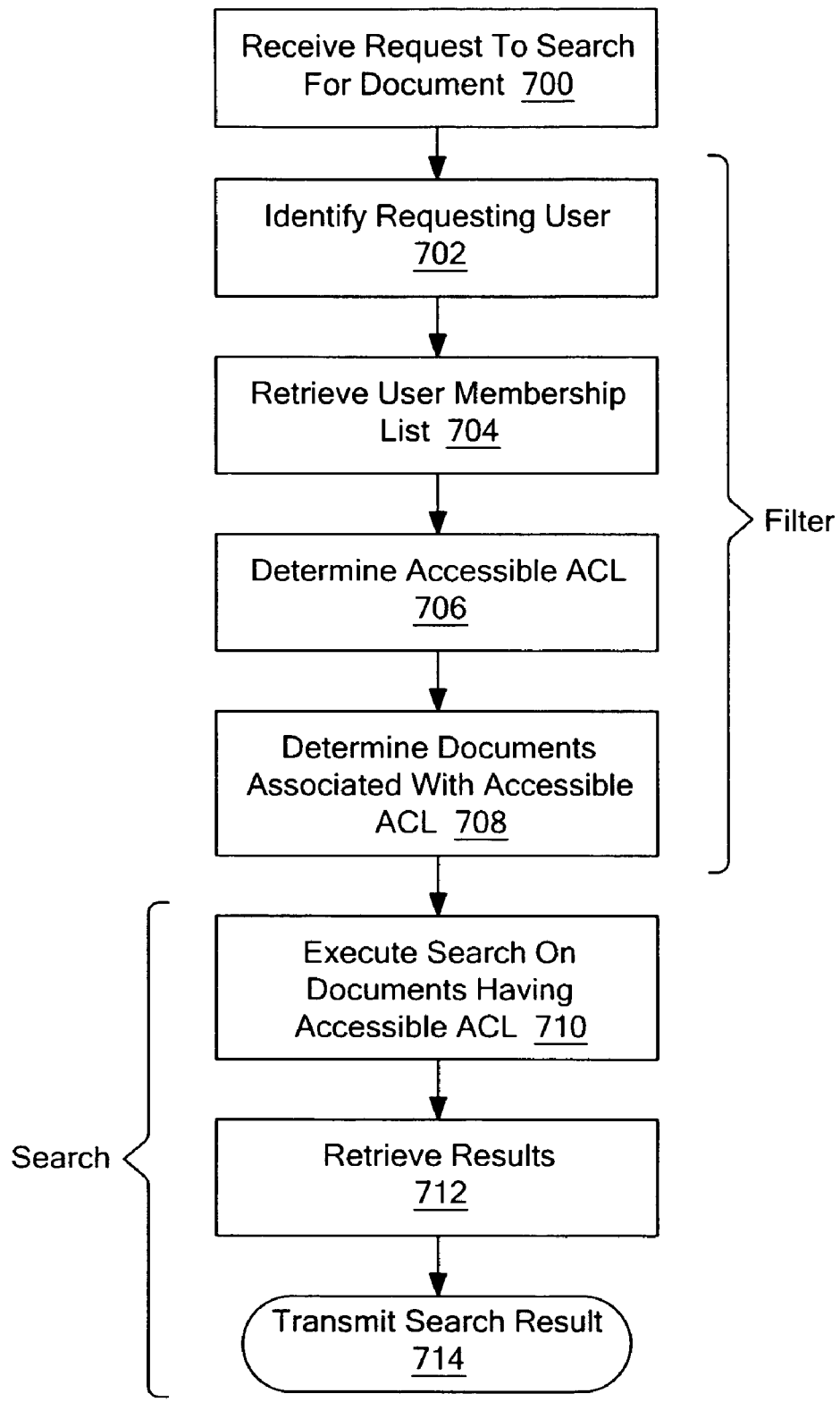
FIG. 7 shows an operation of an access control system in accordance with another embodiment of this invention.

FIG. 7 shows an operation of an access control system in accordance with another embodiment of this invention. As in FIG. 6, search results are filtered based on the user's access privileges before being transmitted to a user. However, in FIG. 7, the search is performed after the documents have been filtered, rather than before. That is, documents to which the user does not have access are not searched. Specifically, at 700, a request to search for a document is received. As in FIG. 6, this request may be to retrieve a specific document or to retrieve documents meeting a certain criteria.

At 702, the user is identified and, at 704, the user's membership list is retrieved. At 706, ACLs accessible by the user is determined. For example, in FIG. 2H, the membership list may be analyzed and ACLs in the list may be extracted. In embodiments in which membership lists do not list ACLs, the other maps (e.g. a direct membership map) may be accessed to determine the ACLs accessible by the user.

At 708, documents associated with the ACL may be determined. For example, a mapping similar to 202 in FIG. 2A may be used to identify documents associated with the ACL and therefore accessible by the user. At 710, a search is executed over the documents accessible by the user.

Therefore, in FIG. 7, the search may be over a significantly smaller number of documents. In systems in which a user may have notably limited access in proportion to the amount of searchable documents, embodiments consistent with FIG. 7, may reduce the time used to retrieve a search result at 712.

At 714, the search results are transmitted to the user. In certain embodiments, these results may be a list of documents. In other embodiments, these results may be the documents. In certain embodiments, these results may be transmitted via other systems, which may further filter the results.

Environments and Systems

Figure 8:
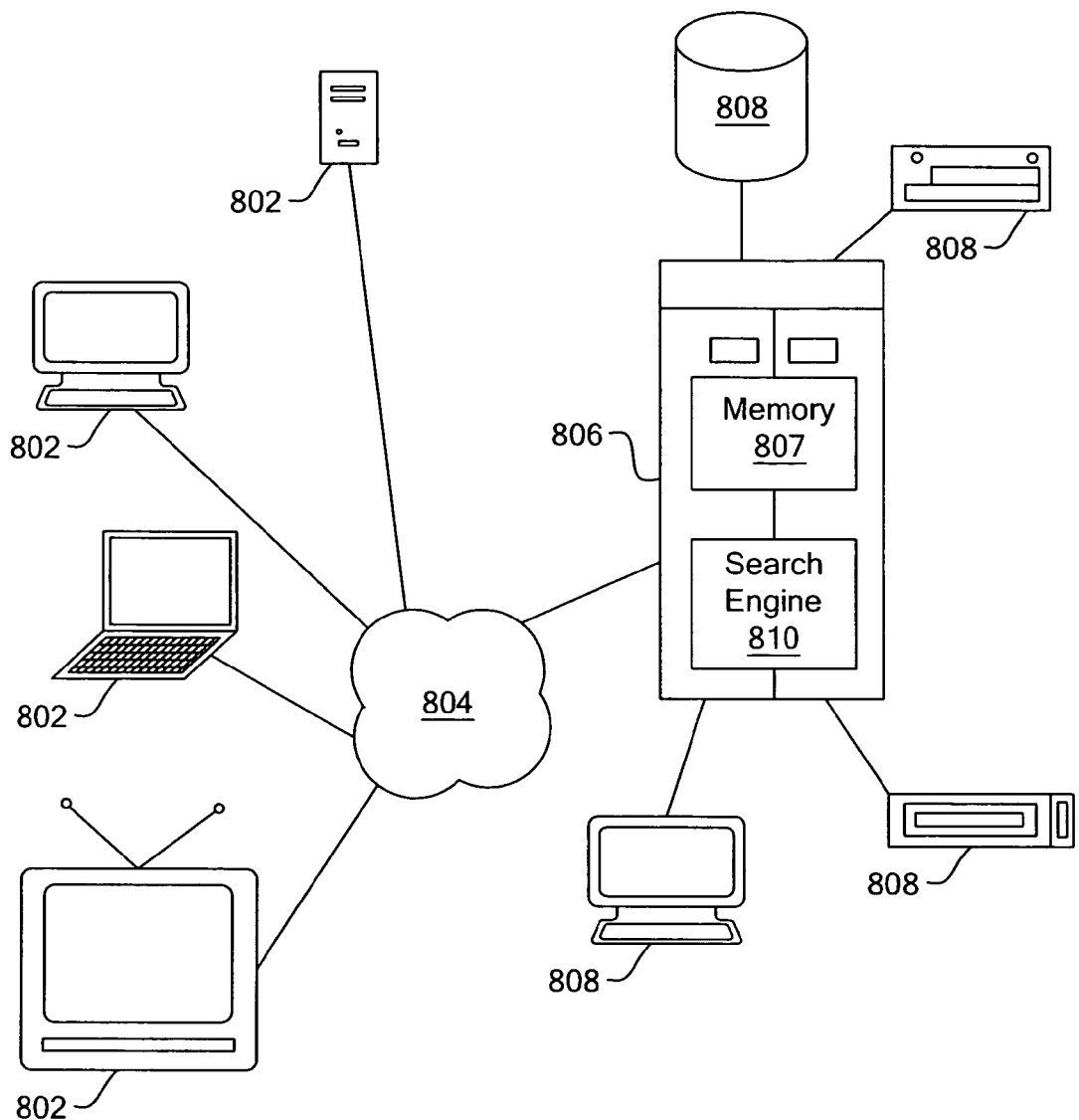
FIG. 8 illustrates an environment for controlling access to documents in accordance with one embodiment of the invention.

An access control system in accordance with embodiments of the present invention may exist in various environments. FIG. 8 illustrates an environment for controlling access to documents in accordance with one embodiment of the invention. In FIG. 8, a user may send a request from a client system 802 via a network 804 to a server 806 for access (e.g. to read, write or execute) to a document stored in any of machines 808. A user may also send a request from client system 802 via a network 804 to an access control system 806 to add/remove a user to the access control system, add/remove/modify an alias (including an ACL) from the access control system, or add/remove a document from the protection of the access control system.

Client system 802 may be a personal computing system, mobile computing systems, telephone systems (e.g. mobile phones), wireless handheld devices (e.g. personal digital assistants (PDAs)), television systems, or the like. Client systems may also be (not shown) dumb terminals, game consoles, set top boxes (e.g. digital cable boxes), and the like.

Network 804 may be a wide area network (WAN), such as the Internet. In other embodiments, network 804 may also be a metropolitan area network (MAN), such as those used on college campuses, a local area network (LAN), such as those used within an office building or household, or a personal area network (PAN), such as those used between wireless computer peripherals.

Network 804 may use a number of communications protocols, including various combinations of protocols at different open systems interconnection (OSI) model levels. For example, network 804 may use integrated services digital network (ISDN), point-to-point protocol (PPP), X.25, internet protocol (IP), transmission control protocol (TCP), user datagram protocol (UDP), file transfer protocol (FTP), and hypertext transfer protocol (HTTP).

In addition, the signals transmitted through network 804 may travel through landlines, airwaves, or a combination thereof. In certain embodiments, network 804 may conform to wireless communications standards such as Bluetooth and the Institute of Electrical and Electronics Engineers (IEEE) 802 standards, e.g. IEEE std. 802.11g-2003, published Jun. 27, 2003.

In addition, network 804 may include devices such as satellites, gateways and routers. For example, network 804 may be a telecommunications network which includes devices to transmit and receive signals from a mobile telephone client through an access tower, to a satellite, down to a base station, through a land-base telephone line and to a computer.

As another example, network 804 may be a computing network which includes devices to transmit and receive signals from a console, through a wireless adapter, to a router, through a broadband modem, to an ISP network of computers, through the Internet backbone and back through another set of devices to a data storage device.

Access control system 806 is shown as a server. In this embodiment, access control system 806 includes memory 807. Memory 807 may store maps, e.g. ACL maps, members maps, direct membership maps, and membership lists. In FIG. 8, access control system 806 includes a search engine 810. In other embodiments, access control system 806 may be coupled to a search engine, e.g. via network 804 or another network. Access control system 806 may receive requests from client system 802. Access control system 806 may also transmit documents in response to the request. In certain embodiments, access control system 806 directs another system to transmit the documents. The documents requested and/or searched may be stored in one or more machines 808. Machines 808 may be any device that may store data, including databases and client system 802.

Figure 9:
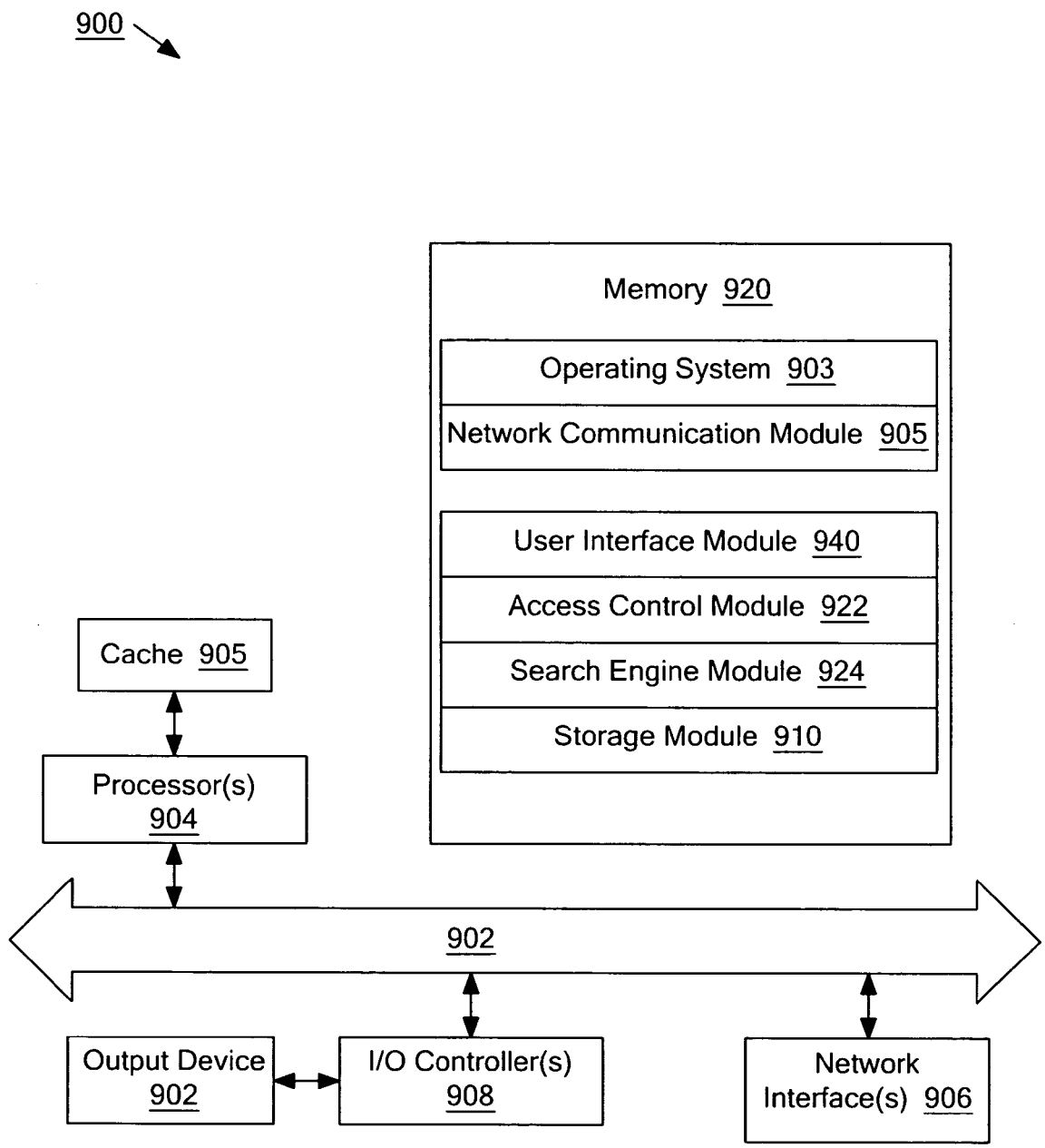
FIG. 9 illustrates an environment for controlling access to documents in accordance with another embodiment of the invention.

FIG. 9 illustrates an environment for controlling access to documents in accordance with another embodiment of the invention. While FIG. 9 illustrates various components of a computer system, it is not intended to represent any particular architecture or manner of interconnecting the components as such details are not germane to the present invention. Other systems that have fewer or more components may also be used with the present invention. Furthermore, some components described above with reference to FIG. 8 may also be employed in FIG. 9.

In FIG. 9, the embodiment includes an inter-connect 902 (e.g., bus and system core logic) to interconnect memory 920 and one or more processor(s) 904, which are coupled to cache 905. Processor(s) 904 may execute instructions stored in memory 905. The inter-connect 902 further interconnects processor(s) 904 and memory 920 to one or more devices 920 via one or more input/output (I/O) controller(s) 908. The inter-connect 902 may include one or more buses coupled with one another through various bridges, controllers, and/or adapters. In one embodiment the I/O controller 908 may include a USB adapter for controlling USB peripherals, an IEEE-1394 bus adapter for controlling IEEE-1394 peripherals, and the like.

Memory 920 may include Read Only Memory (ROM), volatile Random Access Memory (RAM), and non-volatile memory, such as hard drive, flash memory, etc. Volatile RAM is typically implemented as dynamic RAM (DRAM) which requires power continually in order to refresh or maintain the data in the memory. Non-volatile memory typically includes a magnetic hard drive, a magnetic optical drive, or an optical drive (e.g., DVD RAM), or other type of memory system which maintains data even after power is removed from the system. The non-volatile memory may also include a random access memory. Further, the non-volatile memory may include a local device coupled directly to other components in the data processing system. A non-volatile memory that is remote from the system, such as a network storage device coupled to the data processing system through a network interface such as a modem or Ethernet interface, may also be used.

Memory 920 includes instructions for an operating system 903, which may include a network communication module 905. The operating system 903 may include procedures for handling various basic system services and for performing hardware dependent tasks. Examples of the operating system 703 include LINUX, UNIX, Windows, OS/390, OS/400, and the like.

Network communication module 905 is configured with a host/computer name and an internet protocol (IP) address and stores a media access control (MAC) address of a network interface device. The network communication module 905 may include instructions used for connecting the system 900 to other computing devices via wired and/or wireless network/communication interface(s) 906 to networks such as the Internet, a WAN, a LAN, a MAN, or the like.

In one embodiment, memory 920 further includes instructions for access control module 922. Access control module 922 may include instructions for retrieving and intersecting membership lists and ACLs. Access control 922 may also include instructions for adding/removing/modifying memberships, aliases, and ACLs.

Access control module 922 may interact with user interface module 940 to output information, e.g. documents, search results, request denials, membership modification confirmations or the like. Access control module 922 may output the information to output device 920 via I/O controller 908.

In one embodiment, memory 920 further includes instructions for user interface module 940. User interface module 940 may include instructions for displaying graphical user interfaces. User interface module 940 may also include instructions to output information (e.g. documents, search results, request denials, membership modification confirmations or the like) in the graphical user interface.

In one embodiment, memory 920 further includes instructions for search engine module 924. Search engine module 924 includes instructions for searching documents according to criteria provided by a user, e.g. via user interface module 940 or another device connected to system 900 via network/communication interface(s) 906, for example). Search engine module 924 is coupled to access control module 922 such that access control module 922 may filter the search results, e.g. in accordance with FIG. 6 or 7.

In one embodiment, memory 920 further includes instructions for storage module 910. Storage module 910 may include a database, a table, an array, or the like, to store and organize maps, e.g. ACL maps, members maps, direct membership maps, and membership lists. Access control module 922 may communicate with storage module 910 to retrieve the maps used to grant or deny requests for documents or to filter search results.

CONCLUSION

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

In the following detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to unnecessarily obscure the present invention.

Additionally, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings or may be acquired from practice of the invention. Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments.

Reference to a document as used herein may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Reference to a server as used herein may include a software application that carries out tasks on behalf of users such as file serving, application serving, web serving, mail serving, email serving, image server, and the like. The term server as used herein may also include any physical device on which such software is executed, such as a mainframe, a minicomputer, a personal computer, a dedicated server machine, and the like.

Reference to a client as used herein may include any system that accesses a service on another system by some kind of network. These clients include, but are not limited to, systems referred to as terminals, personal computers, thin clients, personal digital assistants (PDAs), mobile telephones, pagers, wireless handheld devices, game consoles and televisions.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, magnetic optical disks, read only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or writing the media in question. Specialty apparatus may include a collection of readily available pieces or an application specific integrated circuit (ASIC) including a series of logic blocks, for example.

The displays presented herein are not inherently related to any particular computer or other apparatus. Various general purpose systems may be used with programs in accordance with the teachings herein or it may be convenient to construct more specialized apparatus to perform the required method. For example, any of the methods according to the present invention can be implemented in hard wired circuitry by programming a general purpose processor or by any combination of hardware and software.

It will be appreciated that the invention can be practiced with systems such as stand-alone computers, hand held devices, multi-processor systems, microprocessor based or programmable consumer electronics, network personal computers, mainframe computers and the like.

The method of the invention may be implemented using computer software. If written in a programming language conforming to a recognized standard sequence of instructions, the methods can be compiled for execution on a variety of hardware platforms or machines and for interface to a variety of operating systems. In addition the present invention is not described with reference to any particular programming language. It will be appreciated that a variety of programming languages may be used to implement the teachings of the invention as described herein.

What is claimed is:

1. A computer-implemented method comprising:
    associating, by a computer system, a user with a first set of aliases, each alias in the first set representing a group of one or more members including the user, the user being associated with the first set of aliases prior to a user request pertaining to a document, wherein associating the user with the first set of aliases comprises mapping the user to aliases in which the user is either a direct or indirect member;
    associating, by the computer system, the document with a second set of aliases, each alias in the second set representing a group of one or more members having access to the document, wherein associating the document with the second set of aliases comprises mapping the document to an access control list;
    upon receiving the user request pertaining to the document, determining whether the first set of aliases associated with the user and the second set of aliases associated with the document have an alias in common by intersecting the first set of aliases associated with the user and the second set of aliases associated with the document without recursively analyzing the first and second sets of aliases;
    granting the user access to the document using the computer system if the first and second set of aliases have an alias in common; and
    denying the user access to the document using the computer system if the first and second sets of aliases do not have an alias in common; and
    taking an action on the first set of aliases when the user is added to or removed from an alias or when an alias containing the user is added to or removed from another alias, the action comprising at least one of invalidating, recomputing and modifying the first set of aliases.

2. The method of claim 1, wherein the document is one of a web page, an object in a software application or a subset of files shared in an online file-sharing application.

3. A computer-implemented method comprising:
    generating for a user a membership list using a computer system to identify aliases having the user as a direct or indirect member, each alias representing a group of one or more members, the membership list generated prior to a request pertaining to a document from the user;
    assigning to the document in a plurality of documents an access control list (ACL) using the computer system to identify aliases whose members have access to the document;
    in response to receiving the request pertaining to the document from the user,
    intersecting the membership list and the ACL using the computer system to determine if the membership list and the ACL have an alias in common without recursively analyzing the membership list and the ACL;
    granting the user access to the document if the intersection results in at least one alias in common;
    denying the user access to the document if the intersection does not result in at least one alias in common; and
    taking an action on the membership list when the user is added to or removed from an alias or when an alias containing the user is added to or removed from another alias, the action comprising at least one of invalidating, recomputing and modifying the membership list.

4. The method of claim 3, further comprising in response to the invalidation, recomputing the membership list independent of the request from the user.

5. The method of claim 3, further comprising recomputing the membership list in response to the request from the user for access to the document or another document in the plurality of documents.

6. The method of claim 3, wherein receiving the request comprises receiving the request over a network.

7. A system comprising:
a processor;
a memory comprising instructions executable by the processor to cause the processor to:
store for each of a plurality of users a membership list to indicate aliases of which the user is a direct or indirect member, each alias representing a group of one or more members, wherein the membership list is computed prior to the user's request for a document;
store access control lists (ACLs) identifying aliases whose members have access to individual documents;
receive from a user a request pertaining to the document;
search for the requested document;
determine if an access control list (ACL) associated with the document and a membership list associated with the user have an alias in common by intersecting the ACL associated with the document and the membership list associated with the user without recursively analyzing the membership list associated with the user and the ACL associated with the document;
prevent access to the document by the user if the access control list associated with the document fails to have an alias in common with the membership list associated with the user;
allow access to the document by the user if the ACL associated with the document has an alias in common with the membership list associated with the user; and
take an action on the membership list when the user is added to or removed from an alias or when an alias containing the user is added to or removed from another alias, the action comprising at least one of invalidating, recomputing and modifying the membership list.

8. The system of claim 7, wherein the memory further comprises instructions executable by the processor to cause the processor to prevent searching of access-restricted documents.

9. The system of claim 7, wherein the memory further comprises instructions executable by the processor to cause the processor to intersect the membership list associated with the user with the ACL associated with the document to determine whether the document is inaccessible by the user.

10. A computer readable storage medium, having stored thereon a set of instructions, which when executed, perform a method comprising:
generating for a user a membership list to identify aliases having the user as a direct or indirect member, each alias representing a group of one or more members and the membership list generated prior to the user's request for a document;
assigning to the document in a plurality of documents an access control list (ACL) to identify aliases whose members have access to the document;
in response to receiving a request pertaining to the document from the user,
intersecting the membership list associated with the user and the ACL associated with the document to determine if the membership list associated with the user and the ACL associated with the document have an alias in common without recursively analyzing the membership list associated with the user and the ACL associated with the document;
granting the user access to the document if the intersection results in at least one alias in common;
denying the user access to the document if the intersection does not result in at least one alias in common; and
taking an action on the membership list when the user is added to or removed from an alias or when an alias containing the user is added to or removed from another alias, the action comprising at least one of invalidating, recomputing and modifying the membership list.

11. The computer readable storage medium of claim 10, wherein the method further comprises recomputing the membership list independent of the request from the user.

12. The computer readable storage medium of claim 10, wherein granting the user access to the document comprises returning a link to the document.

* * * * *